(12) United States Patent
Penera et al.

(10) Patent No.: US 6,173,923 B1
(45) Date of Patent: *Jan. 16, 2001

(54) POWER WING

(75) Inventors: Cecilia A. Penera, Redondo Beach; James Perez, Torrance; Jane R. Felland, Palos Verdes, all of CA (US)

(73) Assignee: Hughes Electronics Corporation, El Segundo, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/123,257

(22) Filed: Jul. 27, 1998

(51) Int. Cl.[7] .................................. B64G 1/44; B60L 1/00
(52) U.S. Cl. ............................................ 244/173; 307/9.1
(58) Field of Search .................................. 244/173, 168, 244/164, 171, 158 R; 136/245, 246, 292; 165/41, 42, 904

(56) References Cited

U.S. PATENT DOCUMENTS

| | | | |
|---|---|---|---|
| 5,228,644 | * | 7/1993 | Garriott et al. ........................ 244/173 |
| 5,271,582 | * | 12/1993 | Perkins et al. ........................ 244/158 R |
| 5,372,183 | * | 12/1994 | Strickberger ........................... 165/41 |
| 5,400,986 | * | 3/1995 | Amore et al. ......................... 244/173 |
| 5,798,574 | * | 8/1998 | Coronel ................................ 244/173 |
| 5,823,476 | * | 10/1998 | Caplin ............................... 244/158 R |
| 5,874,924 | * | 2/1999 | Csongor et al. ....................... 343/797 |

FOREIGN PATENT DOCUMENTS

| | | | |
|---|---|---|---|
| 2672746 | * | 11/1991 | (FR) . |
| 10-258800 | * | 9/1988 | (JP) . |
| 6-329100 | * | 11/1994 | (JP) . |

* cited by examiner

*Primary Examiner*—Peter M. Poon
*Assistant Examiner*—Francis T. Palo
(74) *Attorney, Agent, or Firm*—T. Gudmestad; M. W. Sales

(57) ABSTRACT

A spacecraft (10) having a main body portion (12) comprising a payload module (14), a bus module (16) and an antenna potion (17), a first solar wing (24) having a first side (30) and a second side (32), a second solar wing (26) having a first side (36) and a second side (38), a first battery pack (50) secured to the first solar wing and a second battery pack (52) secured to the second solar wing.

19 Claims, 1 Drawing Sheet

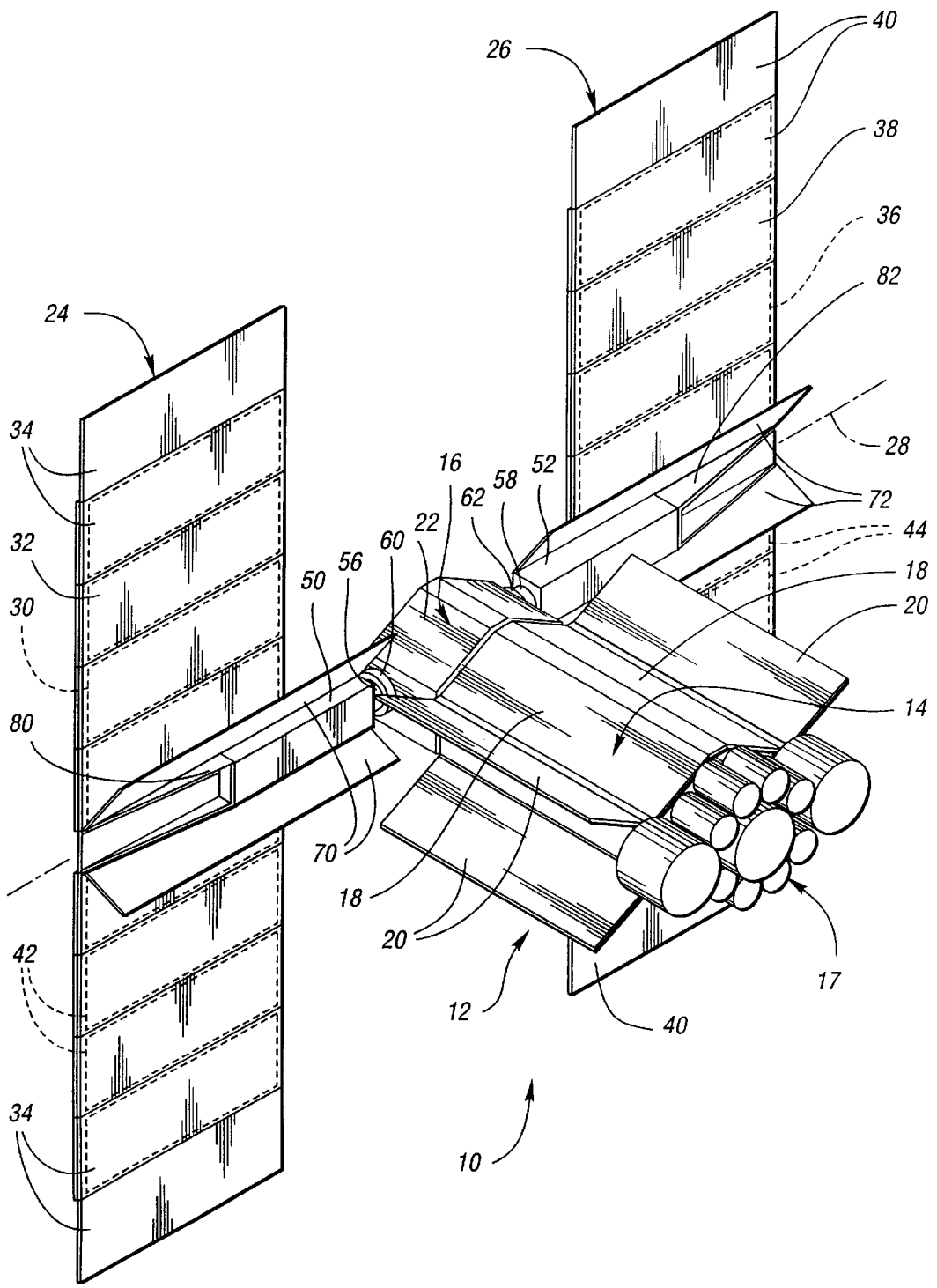

POWER WING

TECHNICAL FIELD

The present invention relates to spacecrafts, and more particularly, to spacecrafts having battery packs integrated into the solar wing structure.

BACKGROUND ART

A typical spacecraft comprises a main body portion comprising a payload module and a bus module, a first solar wing, and a second solar wing. Each solar wing is selectively rotatably by a respective solar wing drive extending from diametrically opposite sides of the main body portion of the spacecraft. Each wing is connected to a boom which connects to a respective solar wing drive. The solar wings are typically planar and have solar cells on one side for converting sunlight into energy for powering the spacecraft.

Spacecrafts usually require four battery packs which supply energy for the spacecraft when the solar cells on the solar wings are not exposed to sunlight. These battery packs are typically secured at the four ends, or corners, of the bottom portion of the main body portion of the spacecraft to balance the weight of the battery packs. This particular placement of the battery packs, while adding stability to the spacecraft, also increases the height of the spacecraft. The height of the spacecraft is determinative of the size of the launch vehicle used for launching the spacecraft and/or the number of spacecrafts that can be launched per flight in a particular launch vehicle.

The main body portion of the spacecraft typically contains radiators for eliminating waste heat generated from the main body portion. The radiators are usually secured to the surfaces defining the main body portion, or can comprise the surfaces defining the main body portion, so that the radiators cover the main body portion. Radiators can also extend from the main body portion to maximize the elimination of spacecraft waste heat generated from the main body portion. Each battery pack has its own radiator which operates to eliminate waste heat generated from the battery pack. With the battery packs positioned on the bottom of the bus module, the height of the spacecraft is increased without increasing the available main body portion radiator space. It would be desirable to maximize the available area for main body portion radiators to maximize the spacecrafts ability to eliminate waste heat from the main body portion without increasing the size of the spacecraft.

Another problem with the positioning of the battery packs on the bottom side of the bus module, in addition to taking up space that could be used for main body portion radiators, is that the battery packs are susceptible to sunlight. Thermal loading from the sunlight operates to decrease the battery pack's operating life and efficiency.

Accordingly, it would be desirable to provide a spacecraft wherein the battery packs were positioned in such a manner as to increase available main body portion radiator area without increasing the size of the spacecraft. It would also be desirable to be able to decrease the height of a spacecraft without decreasing the available main body portion radiator area. It would also be further desirable to provide a spacecraft wherein the battery packs were positioned in such a manner as to reduce their exposure to sunlight thereby improving the battery pack's operating life and efficiency.

DISCLOSURE OF INVENTION

One object of the present invention is to provide a spacecraft wherein the battery packs were positioned in such a manner as to increase available main body portion radiator area without increasing the size of the spacecraft.

Another object of the present invention is to provide a spacecraft wherein the battery packs were positioned in such a manner as to decrease spacecraft height without decreasing available main body portion radiator area.

Yet another object of the present invention is to provide a spacecraft wherein the battery packs were positioned in such a manner as to reduce their exposure to sunlight thereby improving the battery packs' operating life and efficiency.

In carrying out the above objects, the present invention includes a spacecraft having a main body portion, a first solar wing, a second solar wing, a first battery pack secured to the first solar wing and, a second battery pack secured to the second solar wing.

In a preferred embodiment, the spacecraft comprises a bus module, a payload module and an antenna portion, with the solar wings being secured to the bus module of the main body portion.

The above, and other objects, features and advantages of the present invention will be readily apparent from the following detailed description of the best mode for carrying out the invention when taken in connection with the accompanying drawings.

BRIEF DESCRIPTION OF DRAWINGS

FIG. 1 is a perspective view of a spacecraft of the present invention.

BEST MODE FOR CARRYING OUT THE INVENTION

As representative of the present invention, FIG. 1 represents a spacecraft 10. The spacecraft 10 includes a main body portion 12. The main body portion 12 includes a payload module 14, a bus module 16 and an antenna portion 17.

The payload module 14 is defined in part by surfaces comprising stationary radiators 18 and includes retractable radiators 20 extending from the stationary radiators 18. The bus module 16 is defined in part by stationary radiators 22. The radiators 18, 20 and 22 eliminate waste heat from the main body portion 12 of the spacecraft 10.

The payload module 14 preferably includes payload processor components, amplifier components, down converter components and other components, none of which are shown for clarity, for operating the spacecraft 10.

The bus module 16 preferably includes spacecraft control processor components, attitude control components, propulsion components, and other components, none of which are shown for clarity. The antenna portion 17 provides T & C communication with a ground station (not shown).

The spacecraft 10 further includes a first solar wing 24 and a second solar wing 26. Both solar wings 24 and 26 are connected with the bus module 16 of the spacecraft 10. Each solar wing 24 and 26 is rotatable about an axis 28.

The first solar wing 24 has a front side 30 and a back side 32. The first solar wing 24 preferably comprises a first plurality of foldable panels 34. The second solar wing 26 has a front side 36 and a back side 38. The second solar wing 26 preferably comprises a second plurality of foldable panels 40. The panels 34 and 40, while being shown in an operation condition in which they are fully expanded laterally away from the axis 28, are also foldable inward, towards the axis, to a stowed condition.

A first plurality of solar cells 42 is secured to the front side 30 of the first solar wing 24. A second plurality of solar cells 44 is secured to the front side 36 of the second solar wing 26. The solar cells 42 and 44, when exposed to sunlight, generate energy to power the spacecraft 10. The solar cells 42 and 44 may be any known type of solar cell, but are preferably made of silicon or gallium arsenide.

A first rechargeable battery pack 50 is secured to the first solar wing 24. A second rechargeable battery pack 52 is secured to the second solar wing 26.

The battery packs 50 and 52 supply the spacecraft 10 with energy when the solar cells 42 and 44 are not sufficiently exposed to sunlight to generate sufficient energy to power the spacecraft. The battery packs 50 and 52 preferably comprise an aluminum housing containing a plurality of nickel hydrogen battery cells or other suitable battery cells, such as lithium ion battery cells.

The first battery pack 50 is preferably secured to the back side 32 of the first solar wing 24. The second battery pack 52 is preferably secured to the back side 38 of the second solar wing 26. A first support member 80 is secured to a first end of the first battery pack 50 and the back side 32 of the first solar wing 24, and helps to secure the first battery pack 50 to the first solar wing. The first support member 80 also lends additional strength to the first solar wing 24 for supporting the first battery pack 50. A second support member 82 is secured to a first end of the second battery pack 52 and the back side 38 of the second solar wing 26, and helps to secure the second battery pack 52 to the second solar wing. The second battery pack 82 also lends additional strength to the second solar wing 26 for supporting the second battery pack 52.

A first pair of fixed battery radiators 70 are secured to the back side 32 of the first solar wing 24 and to the base of the first batter pack 50. The first pair of fixed battery radiators 70 helps to eliminate waste heat generated from the first battery pack 50. Each of the first pair of fixed battery radiators 70 extends axially from a second end of the first battery pack 50, which faces the bus module 16, to an end of the first solar wing 24 facing away from the bus module. Each of the first pair of fixed battery radiators 70 also extends radially, at an angle away from each other, from the back side 32 of the first solar wing 24 and the base of the first battery pack 50.

A second pair of fixed battery radiators 72 are secured to the back side 36 of the second solar wing 26 and to the base of the second batter pack 52. The second pair of fixed battery radiators 72 helps to eliminate waste heat generated from the second battery pack 52. Each of the second pair of fixed battery radiators 72 extends axially from a second end of the second battery pack 52, which faces the bus module 16, to an end of the second solar wing 26 facing away from the bus module. Each of the second pair of fixed battery radiators 72 also extends radially, at an angle away from each other, from the back side 36 of the second solar wing 26 and the base of the second battery pack 52.

The first solar wing 24 is connected to the bus module 16 of the spacecraft 10 through a first arm member, or a first boom 56. A first solar wing drive 60 is secured to the bus module 16 of the spacecraft 10 and communicates with the first boom 56. Specifically, the first boom 56 extends between and connects the first solar wing drive 60 and a second end, opposite the first end, of the first battery pack 50. The first solar wing drive 60 extends between and connects the first boom 56 and the bus module 16. The first battery pack 50 extends between and connects the first boom 56 and the first solar wing 24. The first solar wing drive 60 causes rotation of the first solar wing 24.

The second solar wing 26 is connected to the bus module 16 of the spacecraft 10 through a second arm member, or a second boom 58. A second solar wing drive 62 is secured to the bus module 16 of the spacecraft 10 and communicates with the second boom 58. Specifically, the second boom 58 extends between and connects the second solar wing drive 62 and a second end, opposite the first end, of the second battery pack 52. The second solar wing drive 62 extends between and connects the second boom 58 and the bus module 16. The second battery pack 52 extends between and connects the second boom 58 and the second solar wing 26. The second solar wing drive 62 causes rotation of the second solar wing 26.

Sun sensor arrays, as are known in the art, are provided to cooperate with the solar wing drives 60 and 62 for rotating the solar wings 24 and 26 so that the solar cells 42 and 44 are exposed to sunlight as much as possible. When exposed to sunlight, the solar cells 42 and 44 generate energy which powers the spacecraft 10 and recharges the battery packs 50 and 52.

A first wiring harness (not shown) extends between and electrically connects the first plurality of solar cells 42, the first battery pack 50 and the bus module 16. A second wiring harness (not shown) extends between and electrically connects the second plurality of solar cells 44, the second battery pack 52 and the bus module 16. The wiring harness convey energy between the first and second plurality of solar cells 42 and 44, the battery packs 50 and 52, and the bus module 16 of the spacecraft 10.

The present invention, having the battery packs 50 and 52 secured to the back sides 32 and 38, respectively, of the solar wings 20 and 24, accomplishes a more efficient use of space for the main body portion 12 of the spacecraft 10, a decrease in thermal loading on the battery packs 50 and 52, and allows for a modular design in which the bus module 16, the solar wings 20 and 24, and the battery packs 50 and 52 can be tested independent of the payload module 14 and antenna portion 17.

While the best mode for carrying out the invention has been described in detail, those familiar with the art to which the invention relates will appreciate other ways of carrying out the invention defined by the following claims.

What is claimed is:

1. A spacecraft having:
   a main body portion comprising a payload module, a bus module and an antenna portion;
   a first solar wing having a first side and a second side;
   a second solar wing having a first side and a second side;
   a first battery pack secured to said first solar wing;
   a second battery pack secured to said second solar wing;
   a first pair of battery radiators secured to said second side of said first solar wing, said first pair of battery radiators in thermal communication with said first battery pack said first pair of battery radiators extending from said second side of said solar wing at an angle with respect to said first solar wing and said first battery pack; and
   a second pair of battery radiators secured to said second side of said second solar wing, said second pair of battery radiators in thermal communication with said second battery pack, said second pair of battery radiators extending from said second side of said solar wing at an angle with respect to said second solar wing and said second battery pack.

2. The spacecraft of claim 1 wherein said first battery pack is secured to said second side of said first solar wing and said second battery pack is secured to said second side of said second solar wing.

3. The spacecraft of claim 2 wherein said first and second solar wings are connected with said main body portion.

4. The spacecraft of claim 3 wherein said first and second solar wings are connected with said bus module of said main body portion.

5. The spacecraft of claim 4 further comprising a first arm member extending between and connecting said bus module and said first battery pack and a second arm member extending between and connecting said bus module and said second battery pack.

6. The spacecraft of claim 5 further comprising a first support member secured to said first battery pack and said first solar wing, and a second support member secured to said second battery pack and said second solar wing.

7. The spacecraft of claim 6 wherein said first support member is secured to said second side of said first solar wing and said second support member is secured to said second side of said second solar wing.

8. The spacecraft of claim 7 further comprising a first set of solar cells secured to said first side of said first solar wing and a second set of solar cells secured to said first side of said second solar wing.

9. A spacecraft comprising:
    a main body portion with a predetermined volume and including a payload module and a bus module;
    said main body portion having a plurality of surfaces comprising stationary radiators;
    a first solar wing in communication with said main body portion, said first solar wing having a first side and a second side;
    a second solar wing in communication with said main body portion, said second solar wing having a first side and a second side;
    a first battery pack secured to said second side of said first solar wing;
    a second battery back secured to said second side of said second solar wing;
    a first pair of battery radiators in communication with said second side of said first solar wing, said first pair of battery radiators in thermal communication with said first battery pack to dissipate waste heat therefrom and extending from said second side of said first solar wing at an angle with respect to both said first solar wing and said first battery pack; and
    a second pair of battery radiators secured to said second side of said second solar wing, said second pair of battery radiators in thermal communication with said second battery pack to dissipate waste heat therefrom and extending from said second side of said second solar wing at an angle with respect to both said second solar wing and said first battery pack;
    wherein said first and second battery packs are positioned so that the area of said main body portion stationary radiators is increased.

10. The spacecraft of claim 9, wherein said main body portion further includes a plurality of retractable radiators extending from some of said plurality of stationary radiators.

11. The spacecraft of claim 9, wherein said first and second battery packs are positioned so that said predetermined main body portion volume is not decreased.

12. The spacecraft of claim 9, wherein said first and second solar wings are connected to said bus module of said main body portion.

13. The spacecraft of claim 10, further comprising a first arm member extending between and connecting said bus module and said first battery pack and a second arm member extending between and connecting said bus module and said second battery pack.

14. The spacecraft of claim 13, further comprising a first support member secured to said first battery pack and said first solar wing, and a second support member secured to said second battery pack and said second solar wing.

15. The spacecraft of claim 14, further comprising a first pair of battery radiators secured to said second side of said first solar wing, said first pair of battery radiators being in thermal communication with said first battery pack.

16. The spacecraft of claim 15, wherein said first pair of battery radiators extend from said second side of said first solar wing at an angle with respect to both said first solar wing and said first battery pack.

17. The spacecraft of claim 15, further comprising a second pair of battery radiators secured to said second side of said second solar wing, said second pair of battery radiators being in thermal communication with said second battery pack.

18. The spacecraft of claim 17, wherein said second pair of battery radiators extend from said second side of said second solar wing at an angle with respect to both said second solar wing and said second battery pack.

19. A spacecraft comprising:
    a main body portion with a predetermined volume and including a payload module and a bus module;
    a first solar wing in communication with said main body portion, said first solar wing having a first side and a second side;
    a second solar wing in communication with said main body portion, said second solar wing having a first side and a second side;
    a first battery pack secured to said second side of said first solar wing;
    a second battery pack secured to said second side of said second solar wing;
    a first pair of battery radiators in communication with said second side of said first solar wing, said first pair of battery radiators angled outwardly with respect to said first solar wing to dissipate excess heat from said first battery pack; and
    a second pair of battery radiators in communication with said second side of said second solar wing, said second pair of battery radiators angled outwardly with respect to said second solar wing to dissipate excess heat from said second battery pack;
    whereby said first and second battery packs are positioned so that said predetermined volume is not decreased.

* * * * *